United States Patent [19]

Yotsumoto et al.

[11] 4,424,238

[45] Jan. 3, 1984

[54] ADHESIVE FOR BONDING POLYESTER FIBROUS MATERIAL TO RUBBER COMPOSITIONS

[75] Inventors: Toshihiro Yotsumoto, Higashimurayama; Kazuo Koyama, Sayama, both of Japan

[73] Assignee: Bridgestone Tire Company Limited, Tokyo, Japan

[21] Appl. No.: 366,033

[22] Filed: Apr. 6, 1982

[30] Foreign Application Priority Data

Apr. 10, 1981 [JP] Japan .................. 56-52938

[51] Int. Cl.$^3$ ................... B05D 3/02; C08L 61/14
[52] U.S. Cl. ................... 427/381; 427/389.9; 427/412; 524/596; 525/501; 528/150; 528/155
[58] Field of Search ........... 525/501; 524/501; 528/150, 155; 156/110 A, 306.3, 335; 428/480, 483; 427/381, 389.9, 412

[56] References Cited

U.S. PATENT DOCUMENTS

| | | | |
|---|---|---|---|
| 3,478,127 | 11/1969 | Petersen | 528/155 |
| 3,549,481 | 12/1970 | Cesare et al. | 528/155 |
| 3,834,934 | 9/1974 | Broisman | 524/501 |
| 3,888,813 | 6/1975 | Moult et al. | 528/155 |
| 3,927,140 | 12/1975 | Rice et al. | 525/501 |
| 3,963,652 | 6/1976 | Tanimura et al. | 525/501 |
| 4,007,233 | 2/1977 | Kako et al. | 528/155 |

FOREIGN PATENT DOCUMENTS 48-22579  3/1973  Japan.

*Primary Examiner*—Theodore E. Pertilla
*Attorney, Agent, or Firm*—Sughrue, Mion, Zinn, Macpeak, and Seas

[57] ABSTRACT

An adhesive having a high adhesive strength and capable of bonding firmly polyester fibrous material with rubber is disclosed, which comprises a mixture of components A and B in a mixing ratio of A/B of 100/5–100/30, said component A being formaldehyde condensate obtained by reacting formaldehyde with one member selected from the following members (1)–(4): (1) a mixture of resorcin with one of m-cresol, m-methoxyphenol, 3,5-xylenol and m-xylene, (2) a mixture of 5-methylresorcin with m-cresol or with m-methoxyphenol, (3) a mixture of m-cresol with p-chlorophenol and (4) m-cresol, and having substantially an average molecular weight of 300–600; and said component B being one member selected from the following members (5)–(7); (5) a formaldehyde condensate obtained by reacting formaldehyde with one of 3,5-xylenol, m-t-butylphenol and a mixture of m-cresol with m-t-butylphenol and having substantially an average molecular weight of 200–500, (6) 4,4'-thio-bis(6-t-butyl-3-methylphenol) and (7) 1,1'-bis(2,4-dihydroxyphenyl) disulfide.

3 Claims, No Drawings

ADHESIVE FOR BONDING POLYESTER FIBROUS MATERIAL TO RUBBER COMPOSITIONS

BACKGROUND OF THE INVENTION

1. Field of the Invention

The present invention relates to an adhesive for polyester fibrous material, and more particularly relates to a novel adhesive capable of bonding strongly polyester fibrous material with rubber and having high resistance against deterioration during the use at high temperature.

2. Description of the Prior Art

Polyester materials, such as polyethylene terephthalate and the like, which are linear polymers having ester linkages in the main chain, are superior to nylon material and the like in the retention of stable dynamic properties, for example, low stress relaxation, low creep property and good recovery after stretching. Therefore, polyester material is very advantageously used as a reinforcing material for rubber articles, such as tire, belt, air cushion, rubber hose and the like, in the form of a filament, yarn, cord, cable, cord fabric, canvas and the like.

However, polyester has a dense hyper-structure and a small number of functional groups, and therefore when it is intended to use polyester material as a reinforcing material for these rubber articles, polyester material can not be satisfactorily bonded to rubber by means of RFL liquid comprising resorcin/formaldehyde initial condensate and rubber latex and being an adhesive capable of bonding strongly nylon material, rayon material and the like to rubber.

In order to obviate this drawback, there have hitherto been proposed a method, wherein polyester surface is treated with alkali or amine to increase the number of active groups, such as —OH, —COOH, —NR$_2$ groups and the like, wherein R represents a hydrogen atom or an alkyl group, on the surface, and then the polyester is treated with RFL; and a method, wherein a functional group having a bonding ability with hydrogen or capable of forming primary bond is introduced into polyester surface by an isocyanate compound or epoxy compound, and then the polyester is treated with RFL; and various adhesive compositions used for these methods.

However, isocyanate compound and epoxy compound have a high reactivity and react with water and RF, which water is used as a solvent for RFL, and therefore it is difficult to use isocyanate compound or epoxy compound in a one-bath system adhesive liquid. In order to obviate this drawback, the treatment for polyester with the adhesive must be carried out in two stages. However, a more complicated installation and a larger amount of heat are required in the two stage treatment, and the two stage treatment is not preferable in view of the resource saving and energy saving. Moreover, epoxy compound and isocyanate compound fume in a large amount during the heat treatment, and are not preferable in view of environmental pollution and public nuisance. In addition, polyester fiber is hardened by a pretreatment with an epoxy compound or isocyanate compound, and it is difficult to treat the polyester fiber. As a result, rubber articles reinforced with polyester fibers treated with the adhesive containing an epoxy compound or isocyanate compound are short in the life, and when the rubber articles are used under high strain or at high temperature, the adhesive layer deteriorates rapidly.

While, as an adhesive for polyester fibrous materials, which can treat them in one stage in a one bath system, there have been proposed an adhesive, which uses a tricyclic cocondensate formed of a resorcin derivative and a phenol derivative in combination with RFL (Japanese Patent Application Publication No. 11,251/71); an adhesive, which uses a methylolated reaction product of an active methylene group-containing p-substituted phenol (oligomer) with resorcin in combination with RFL (Japanese Patent Application Publication No. 39,567/72). However, these adhesives are still insufficient in the adhesive strength required in the rubber industry.

SUMMARY OF THE INVENTION

It is an object of the present invention to provide an adhesive, which develops a high adhesive strength by a one stage treatment, is low in the deterioration of the adhesive strength during the use at high temperature, and can produce a flexible cord by the treatment with the adhesive. The adhesive of the present invention has the following composition.

That is, the feature of the present invention lies in an adhesive for polyester, comprising a mixture of components A and B in a weight mixing ratio of A/B of not less than 100/5 but less than 100/30, said component A being a formaldehyde condensate obtained by reacting formaldehyde with one member selected from the following members (1)–(4): (1) a mixture of resorcin with one compound selected from the group consisting of m-cresol, m-methoxyphenol, 3,5-xylenol and m-xylene; (2) a mixture of 5-methylresorcin with m-cresol or with m-methoxyphenol; (3) a mixture of m-cresol with p-chlorophenol; and (4) m-cresol, in the presence of an acidic catalyst and having substantially an average molecular weight of 300–600, and said component B being one member selected from the following members (5)–(7): (5) a formaldehyde condensate obtained by reacting formaldehyde with one member selected from the group consisting of 3,5-xylenol, m-t-butylphenol and a mixture of m-cresol with m-t-butylphenol in the presence of an acidic catalyst and having substantially an average molecular weight of 200–500; (6) 4,4'-thio-bis(6-t-butyl-3-methylphenol); and (7) 1,1'-bis(2,4-dihydroxyphenyl) disulfide.

DESCRIPTION OF THE PREFERRED EMBODIMENT

The adhesive for polyester of the present invention is used in combination with resorcin/formaldehyde/latex (RFL) which is a commonly known vulcanizable adhesive assistant. Component A of the adhesive for polyester of the present invention has a high reactivity with RF in the RFL and further has a high affinity to polyester. Therefore, the adhesive diffuses to the vicinity of polyester surface and acts as a bonding agent of the RFL with polyester fibrous material. It is necessary that component A has an average molecular weight of 300–600. When the average molecular weight of component A is smaller than 300, although the component A is diffused, it has a high movability due to its small molecular weight and does not fix at the vicinity of polyester fiber surface. While, component A having an average molecular weight of larger than 600 is poor in the diffusing property due to its large molecular weight, and does not develop its adhesive strength.

While, component B of the adhesive of the present invention is lower than component A in the reactivity with RF in RFL, but is higher than component A in the affinity to polyester and in the diffusing property into polyester. Therefore, component B has an action for expanding the distance between the molecular chains of polyester and has an effect for promoting the diffusion of component A into the interior of polyester molecule. It is preferable that component B has an average molecular weight of 200–500 and has a structure formed of two hydroxybenzene derivatives jointed with each other. Component B having a molecular weight of smaller than 200 cannot expand polyester molecule. While, component B having a molecular weight of larger than 500 is poor in the diffusing property into polyester due to its excessively large molecular weight, and cannot give a high adhesive strength to the resulting adhesive.

The mixing ratio of component A to component B is within the range of 100/5–100/30 in solid basis. When the ratio is less than 100/5, component B cannot exhibit its effect for promoting the adhesion of component A. While, when the ratio is not less than 100/30, component B acts adversely on the adhesion of the resulting adhesive.

The adhesive of the present invention, which comprises the above described components A and B, is adhered to polyester fibrous material by a two stage treatment, wherein an adhesive is firstly adhered to a polyester fibrous material and then the fibrous material is treated with resorcin/formaldehyde/latex (RFL); or by a one stage treatment, wherein polyester fibrous material is treated with an adhesive composition previously produced by mixing the above described adhesive for polyester with RFL.

In any of the one stage treatment and two stage treatments, it is preferable that the adhesive of the present invention is previously diluted with water, and polyester fibrous material is treated with the diluted adhesive. When the adhesive is diluted with water, it is preferable to dissolve the adhesive in alkaline water. However, an adhesive which is insoluble in alkaline water, is dispersed in water in the presence of an optional anionic surfactant by means of a dispersing apparatus, such as ball mill, sand mill or the like.

In the one stage treatment, an aqueous solution or aqueous dispersion of the adhesive of the present invention, which comprises the above described components A and B, is mixed with RFL to form an adhesive composition liquid. The mixing ratio of the adhesive to RFL is within the range of 25/100–125/100 (in solid basis and weight ratio). When the mixing ratio is lower than the lower limited or is higher than the upper limit of the above described mixing ratio, the resulting adhesive composition liquid is poor in the adhesive strength. The above obtained adhesive composition liquid (hereinafter, referred to as adhesive liquid) is adhered to a polyester fibrous material to produce an adhesive-treated polyester fibrous material. The above treated fibrous material is contacted with vulcanizable unvulcanized rubber, and the resulting mass is vulcanized, whereby the rubber can be firmly bonded to the polyester fibrous material. As the method for adhering the adhesive liquid to the polyester fibrous material, there can be used a method wherein the fibrous material is immersed in the adhesive liquid; a method wherein the adhesive liquid is applied to or sprayed on the fibrous material and the like. These methods can be properly selected depending upon the purpose.

After the adhesive liquid is adhered to the fibrous material, the fibrous material is heat treated to produce an adhesive-treated polyester fibrous material. This heat treatment is carried out at a temperature of not lower than 200° C., preferably 220°–250° C. The reason is as follows. The adhesive of the present invention exhibits its adhesive strength after the adhesive has been diffused into polyester fiber. As the treating temperature is higher, more excellent result can be obtained. When the temperature is lower than 200° C., the diffusing property of the adhesive is very poor. While, when the temperature is higher than 250° C., polyester fiber is deteriorated and is decreased in its strength, and a satisfactory result cannot be obtained. In the treatment by an ordinary adhesive, a drying treatment is carried out at a temperature of not higher than 200° C. in order to volatilize the solvent before this heat treatment. In the present invention also, this drying treatment can be carried out before the heat treatment.

The RFL to be used in the present invention can be produced in the following manner. A mixture of resorcin and formaldehyde in a mixing ratio within the range of 1.0/0.8–1/7 (molar ratio) is matured for several hours in the presence of an alkali catalyst (for example, sodium hydroxide, potassium hydroxide, ammonium hydroxide, urea, thiourea and the like), the matured mixture is mixed with rubber latex in a mixing ratio within the range of 1/100–35/100 (weight ratio), and the resulting mixture is further matured for several hours. Alternatively, resorcin, formaldehyde and rubber latex are all mixed in the above described mixing ratio, and the resulting mixture is matured. The amount of the alkali catalyst to be used is adjusted so as to obtain an RFL having a pH within the range of 8.5–12.0. A particularly preferable catalyst is ammonium hydroxide. In this case, it is preferable to prepare firstly a mixture of resorcin, formaldehyde and rubber latex, and then to mature the mixture. As the rubber latex to be used in the RFL, use is made of at least one of natural rubber latex and synthetic rubber latexes, such as styrene/butadiene copolymer rubber latex, styrene/vinylpyridine/butadiene copolymer rubber latex and the like. The kind of the rubber latex is generally determined depending upon the kind of rubber be bonded.

When the adhesive according to the present invention is adhered to polyester fiber in the two stage treatment, the polyester fiber is immersed in an aqueous alkali solution or aqueous dispersion of the adhesive, or in an aqueous solution containing the adhesive and an organic solvent, such as alcohol or the like; the polyester fiber is heat treated at a temperature of 220°–250° C. and then immersed in an RFL liquid to adhere the RFL to the polyester fiber; and the above treated polyester fiber is again heat treated at a temperature of 200°–250° C. In the two stage treatment, since the adhesive has been fully diffused into the polyester fiber during the first stage heat treatment by the adhesive, a satisfactorily high adhesive strength of the adhesive can be obtained by the second stage heat treatment, at a temperature of 200°–250° C., of the polyester fiber having the RFL adhered thereto.

The following examples are given for the purpose of illustration of this invention and are not intended as limitations thereof. In the examples, "parts" and "%" mean by weight.

EXAMPLE 1

A. Production of m-cresol/resorcin/formaldehyde cocondensate (component A)

Into a reactor equipped with a thermometer, an agitator, a reflux cooler and a dropping funnel were charged 108 parts (1 mol) of m-cresol, 130 parts of water and 1.1 parts of potassium hydroxide, and 154 parts of 37% aqueous formaldehyde solution was added dropwise to the mixture in 2 hours while agitating the resulting mixture at 60° C. After completion of the addition of the formaldehyde solution, an agitation was further continued for 3 hours at 60° C., and then the mass was cooled to obtain a homogeneous transparent resol type precondensate of m-cresol.

Into another reactor having the same equipments as described above were charged 220 parts (2 mol) of resorcin, 110 parts of water and 2.5 parts of oxalic acid, and the resulting mixture was heated at 60° C. to form a solution. Then, the above obtained m-cresol-formaldehyde reaction liquid was added dropwise to the solution in 2 hours while agitating the resulting mixture at 60° C. After completion of the addition, the resulting mixture was further agitated at 60° C. for 3 hours, and then water in the reaction liquid was removed. The residue was poured into a distillation vessel, and unreacted m-cresol and resorcin were removed by a distillation under reduced pressure to obtain a m-cresol/resorcin/formaldehyde cocondensate.

B. Production of 3,5-xylenol/formaldehyde condensate (component B):

Into a reactor equipped with a thermometer, an agitator, a reflux cooler and a dropping funnel were charged 122 parts (1 mol) of 3,5-xylenol and 0.6 part of oxalic acid. After the mixture was heated to 150° C., 16.2 parts of 37% aqueous formaldehyde solution was added dropwise to the mixture in two hours, while agitating the resulting mixture without heating. During the dropwise addition of the aqueous formaldehyde solution, the temperature of the reaction system in the reactor was lowered due to the addition of water in the aqueous formaldehyde solution to the reaction system, and the temperature of the reaction system was 102° C. at the final stage of the addition of the formaldehyde solution. The resulting mixture was further agitated at 102° C. for 2 hours and then water was removed from the reaction solution. The residue was charged into a distillation vessel, and unreacted 3,5-xylenol was removed by a distillation under reduced pressure to obtain a 3,5-xylenol/formaldehyde condensate.

The m-cresol/resorcin/formaldehyde cocondensate obtained in the above described method was sampled in an amount of 15 parts in solid basis, and 10.5 parts of 28% aqueous ammonia solution and 73.5 parts of water were added to the sampled cocondensate to obtain an aqueous ammonia solution of the m-cresol/resorcin/formaldehyde cocondensate.

While, the 3,5-xylenol/formaldehyde condensate was sampled in an amount of 15 parts in solid basis, and 1.5 parts of Demol EP (trademark of anionic surfactant sold by Kao Atlas Co.) and 83.5 parts of water were added to the sampled condensate, and the resulting mixture was charged into a laboratory sand mill and agitated at high speed to obtain an aqueous dispersion containing 15% of the solid substance of the 3,5-xylenol/formaldehyde condensate.

To 100 parts of the above obtained aqueous ammonia solution of m-cresol/resorcin/formaldehyde cocondensate was added 100 parts of the above obtained aqueous dispersion of 3,5-xylenol/formaldehyde condensate. Then, 75 parts of the resulting mixture was mixed with 100 parts of an RFL having a composition shown in the following Table 1 to produce an adhesive liquid. This RFL had previously been produced by aging for 48 hours a mixture having the following composition.

TABLE 1

|  | Parts |
|---|---|
| Water | 518.8 |
| Resorcin | 11.0 |
| Formaldehyde (37%) | 16.2 |
| Ammonium hydroxide (28%) | 10.0 |
| Vinylpyridine/styrene/butadiene copolymer rubber latex (41%) | 244.0 |

As a polyester fibrous material, there was used a polyethylene terephthalate tire cord having a twist structure of 1,500 d/2, a ply twist number of 40 turns/10 cm and a cable twist number of 40 turns/10 cm. The tire cord was immersed in the above described adhesive liquid, dried at 150° C. for 1.5 minutes and then heat treated for 2 minutes under an air atmosphere kept at 240° C.

Then, the cord treated with the above described adhesive liquid was embedded in the unvulcanized rubber composition having a compounding recipe shown in the following Table 2, and the mass was vulcanized at 145° C. for 30 minutes under a pressure of 20 kg/cm$^2$.

TABLE 2

|  | Parts |
|---|---|
| Natural rubber | 80 |
| Styrene/butadiene copolymer rubber | 20 |
| Carbon black | 40 |
| Stearic acid | 2 |
| Petroleum series softener | 10 |
| Pine tar | 4 |
| Zinc oxide | 5 |
| N—Phenyl-$\beta$-naphthylamine | 1.5 |
| 2-Benzothiazyl disulfide | 0.75 |
| Diphenylguanidine | 0.75 |
| Sulfur | 2.5 |

The cord was digged out from the vulcanizate and peeled from the vulcanizate at a rate of 30 cm/min to measure the peeling resistance, which was the adhesive strength (kg/cord) of the adhesive liquid. The obtained results are shown in Table 3.

EXAMPLES 2 AND 3

Adhesive liquids were produced and the adhesive strengths thereof were measured in the same manners as described in Example 1, except that 3,5-xylenol used in component B in Example 1 was replaced by t-butylphenol or a mixture of t-butylphenol with m-cresol, respectively. The obtained results are shown in Table 3.

EXAMPLES 4 AND 5

Adhesive liquids were produced and the adhesive strengths thereof were measured in the same manners as described in Example 1, except that the 3,5-xylenol/formaldehyde condensate used as component B in Example 1 was replaced by 4,4'-thio-bis(6-t-butyl-3-methylphenol) or 1,1'-bis(2,4-dihydroxyphenyl) disulfide, respectively. The obtained results are shown in Table 3.

COMPARATIVE EXAMPLE 1

An adhesive liquid was produced and the adhesive strength thereof was measured in the same manner as described in Example 1, except that the 3,5-xylenol/formaldehyde condensate used as component B in Example 1 was not used, and 75 parts of the aqueous solution of m-cresol/resorcin/formaldehyde cocondensate used as component A in Example 1 was alone mixed with 100 parts of the same RFL as used in Example 1. The obtained results are shown in Table 3.

EXAMPLES 6, 7 AND COMPARATIVE EXAMPLE 9

The influence of the mixing ratio of component A/component B used in Example 1 upon the adhesive strength of the resulting adhesive was investigated. The obtained results are shown in Table 4.

EXAMPLE 9

An aqueous dispersion of m-methoxyphenol/resorcin/formaldehyde cocondensate was produced in the same manner as described in Example 1, except that m-cresol used in component A in Example 1 was replaced by m-methoxyphenol.

To 100 parts of the resulting aqueous dispersion of the cocondensate was added 10 parts of m-cresol/m-t-butylphenol/formaldehyde cocondensate produced in Example 3 as component B. To 75 parts of the resulting mixture was added 100 parts of the same RFL as used in Example 1 to produce an adhesive liquid. The adhesive strength of the adhesive liquid was evaluated in the same manner as described in Example 1. The obtained results are shown in Table 5.

EXAMPLES 10-15

The adhesive liquids were produced and the adhesive strengths thereof were measured in the same manners as described in Example 9, except that the m-methoxyphenol/resorcin/formaldehyde cocondensate used as component A in Example 9 was replaced by a 3,5-xylenol/resorcin/formaldehyde cocondensate, m-cresol/5-methylresorcin/formaldehyde cocondensate, m-methoxyphenol/5-methylresorcin/formaldehyde cocondensate, m-cresol/p-chlorophenol/formaldehyde cocondensate, m-xylene/resorcin/formaldehyde cocondensate or m-cresol/formaldehyde condensate, respectively. The obtained results are shown in Table 5.

COMPARATIVE EXAMPLES 2-8

The adhesive liquids were produced and the adhesive strengths thereof were measured in the same manner as described in Examples 9-15, except without using the m-cresol/t-butylphenol/formaldehyde cocondensate used as component B in Examples 9-15. The obtained results are shown in Table 5 together with results in Examples 9-15.

TABLE 3(a)

| | A | B | Adhesive strength in one stage treatment (kg/cord) |
|---|---|---|---|
| Example 1 | 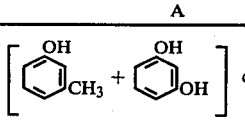 cocondensate | 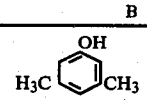 condensate | 3.52 |
| Example 2 | 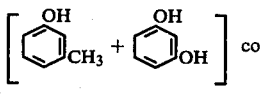 cocondensate | 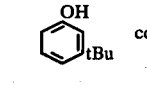 condensate | 3.48 |
| Example 3 | 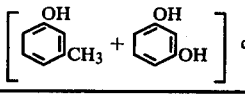 cocondensate | 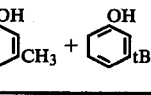 cocondensate | 3.45 |

TABLE 3(b)

| | A | B | Adhesive strength in one stage treatment (kg/cord) |
|---|---|---|---|
| Example 4 | 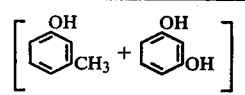 cocondensate | 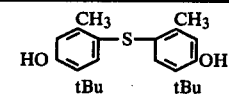 | 3.40 |
| Example 5 | 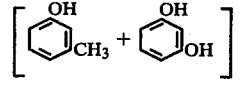 cocondensate | 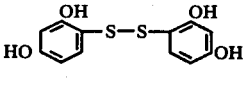 | 3.40 |
| Comparative example | 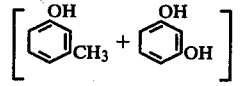 cocondensate | not used | 3.27 |

TABLE 4

| | A | B | Adhesive strength in one stage treatment (kg/cord) |
|---|---|---|---|
| | [cresol (OH, CH3) + resorcin (OH, OH)] cocondensate | 2,6-xylenol (OH, H3C, CH3) condensate | |
| Example 6 | 100:5 | | 3.45 |
| Example 1 | 100:10 | | 3.52 |
| Example 7 | 100:20 | | 3.42 |
| Comparative Example 9 | 100:30 | | 3.27 |

TABLE 5(a)

| | A | B | Adhesive strength in one stage treatment (kg/cord) | Comparative example — Without the use of component B in the Examples in the left side | Adhesive strength in one stage treatment (kg/cord) |
|---|---|---|---|---|---|
| Example 9 | [guaiacol (OH, OCH3) + resorcin (OH, OH)] cocondensate | [cresol (OH, CH3) + p-tert-butylphenol (OH, tBu)] cocondensate | 3.38 | Comparative example 2 | 3.20 |
| Example 10 | [2,6-xylenol (OH, H3C, CH3) + resorcin (OH, OH)] cocondensate | [cresol + p-tert-butylphenol] cocondensate | 3.52 | Comparative example 3 | 3.36 |
| Example 11 | [cresol (OH, CH3) + 5-methylresorcin (OH, H3C, OH)] cocondensate | [cresol + p-tert-butylphenol] cocondensate | 3.40 | Comparative example 4 | 3.22 |
| Example 12 | [guaiacol (OH, OCH3) + 5-methylresorcin (OH, H3C, OH)] cocondensate | [cresol + p-tert-butylphenol] cocondensate | 3.46 | Comparative example 5 | 3.26 |

TABLE 5(b)

| | A | B | Adhesive strength in one stage treatment (kg/cord) | Comparative example — Without the use of component B in the Examples in the left side | Adhesive strength in one stage treatment (kg/cord) |
|---|---|---|---|---|---|
| Example 13 | [cresol (OH, CH3) + p-chlorophenol (OH, Cl)] cocondensate | [cresol + p-tert-butylphenol] cocondensate | 3.20 | Comparative example 6 | 3.06 |
| Example 14 | [2,3-xylenol (CH3, CH3, OH) + phenol (OH)] cocondensate | [cresol + p-tert-butylphenol] cocondensate | 3.00 | Comparative example 7 | 2.80 |
| Example 15 | cresol (OH, CH3) condensate | [cresol + p-tert-butylphenol] cocondensate | 2.90 | Comparative example 8 | 2.70 |

What is claimed is:

1. An adhesive for bonding polyester material to rubber compositions comprising a mixture of components A and B in a weight mixing ratio of A/B of not less than 100/5 but less than 100/30, said component A being a formaldehyde condensate obtained by reacting formaldehyde with one member selected from the following members (1)–(4):

(1) a mixture of resorcin with one compound selected from the group consisting of m-cresol, m-methoxyphenol, 3,5-xylenol and m-xylene; (2) a mixture of 5-methylresorcin with m-cresol or with m-methoxyphenol; (3) a mixture of m-cresol with p-chlorophenol; and (4) m-cresol, in the presence of an acidic catalyst and having substantially an average molecular weight of 300–600, and said component B being one member selected from the following members (5)–(7): (5) a formaldehyde condensate obtained by reacting formaldehyde with one member selected from the group consisting of 3,5-xylenol, m-t-butylphenol and a mixture of m-cresol with m-t-butylphenol in the presence of an acidic catalyst and having substantially an average molecular weight of 200–500; (6) 4,4'-thio-bis(6-t-butyl-3-methylphenol); and (7) 1,1'-bis(2,4-dihydroxyphenyl)disulfide.

2. A method for giving an adhesive force to polyester fibrous material comprising:

(1) applying a solution or dispersion of the adhesive of claim 1 to the polyester fibrous material,
(2) drying the resulting polyester fibrous material of step (1),
(3) treating the fibrous material of step (2) with resorcin/formaldehyde/latex (RFL), and
(4) drying the resulting polyester fibrous material of step (3).

3. A method for giving an adhesive force to polyester fibrous material comprising:

(1) treating the polyester fibrous material with an adhesive composition comprising a mixture of the adhesive of claim 1 and resorcin/formaldehyde/latex (RFL), and
(2) drying the resulting polyester fibrous material of step (1).

* * * * *